United States Patent
Morisawa (10) Patent No.: US 7,752,481 B2
(45) Date of Patent: Jul. 6, 2010

(54) INFORMATION PROCESSING APPARATUS AND RESUME CONTROL METHOD

(75) Inventor: Toshikazu Morisawa, Tokorozawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 920 days.

(21) Appl. No.: 11/582,026

(22) Filed: Oct. 17, 2006

(65) Prior Publication Data

US 2007/0101171 A1 May 3, 2007

(30) Foreign Application Priority Data

Oct. 31, 2005 (JP) ............................. 2005-316334

(51) Int. Cl.
*G06F 1/04* (2006.01)
*G06F 1/14* (2006.01)

(52) U.S. Cl. .................. 713/502; 713/323; 713/600

(58) Field of Classification Search .................. 713/300, 713/320–330, 501, 502, 600
See application file for complete search history.

(56) References Cited

U.S. PATENT DOCUMENTS

| 6,275,932 | B1 * | 8/2001 | Yamaguchi et al. ............. 713/2 |
| 6,829,714 | B2 * | 12/2004 | Smith et al. .................. 713/330 |
| 6,832,311 | B2 | 12/2004 | Morisawa |
| 7,069,462 | B2 * | 6/2006 | Owen et al. .................. 713/502 |
| 7,149,915 | B2 * | 12/2006 | Matsuoka et al. ........... 713/502 |
| 2003/0226049 | A1 | 12/2003 | Mantani |

FOREIGN PATENT DOCUMENTS

| JP | 10-63362 | 3/1988 |
| JP | H04-239963 A | 8/1992 |
| JP | H05-88791 A | 4/1993 |
| JP | 10-049246 | 2/1998 |
| JP | 11-045131 | 2/1999 |
| JP | 2000-81921 | 3/2000 |
| JP | 2003-131766 | 5/2003 |
| WO | WO 02/21245 A1 | 3/2002 |

OTHER PUBLICATIONS

English translation of Japanese Office Action dated Jun. 10, 2008.
English Translation of Japanese Office Action dated Sep. 9, 2008.

* cited by examiner

*Primary Examiner*—Dennis M Butler
(74) *Attorney, Agent, or Firm*—Knobbe Martens Olson & Bear, LLP (57) ABSTRACT

According to one embodiment, there is provided an information processing apparatus, including a first clock portion to output a first signal when a measurement value coincides with first set time, a second clock portion to output a second signal when a measurement value coincides with second set time, and a controller to perform control to execute resume processing for a first purpose when the first clock portion outputs the first signal, and execute resume processing for a second purpose when the second clock portion outputs the second signal.

11 Claims, 6 Drawing Sheets

| Clocking means | Type | Purpose in resume processing |
|---|---|---|
| RTC 51 | Standard | General purpose (resume all elements before suspending) |
| Timer 54 | Option | Specific purpose (operate specific elements) |

INFORMATION PROCESSING APPARATUS AND RESUME CONTROL METHOD

CROSS-REFERENCE TO RELATED APPLICATIONS

This application is based upon and claims the benefit of priority from prior Japanese Patent Application No. 2005-316334, filed Oct. 31, 2005, the entire contents of which are incorporated herein by reference.

BACKGROUND

1. Field

One embodiment of the invention relates to an information processing apparatus having a resume function and a resume control method.

2. Description of the Related Art

An information processing apparatus, such as a personal computer, has a resume function of restoring the system of the apparatus from a non-work state (suspended state) to a condition as was immediately before power is turned off. The resume function is implemented by a scheduler provided in the information processing apparatus.

Various techniques have been proposed in relation to the resume function. For example, Jpn. Pat. Appln. KOKAI Publication No. 10-63362 proposes a technique, which allows the user to designate a resume factor for each of programs and performs resume processing based on a table showing the correspondence between a program and a resume factor.

In general, when the resume function is implemented by a scheduler, a real time clock (RTC) provided in the information processing apparatus as standard equipment is used. However, if the RTC is used, the starting time of the resume processing of a specific purpose cannot be managed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an information processing apparatus, including a first clock configured to output a first signal when a measurement value coincides with a first pre-set time, a second clock configured to output a second signal when a measurement value coincides with a second pre-set time, and a controller configured to control a first resuming process of operation when the first clock outputs the first signal, and a second resuming process of operation when the second clock outputs the second signal.

First, a configuration of an information processing apparatus according to an embodiment of the invention will be described with reference to FIGS. 1 and 2. The information processing apparatus is implemented as, for example, a notebook computer 10.

Figure 1:
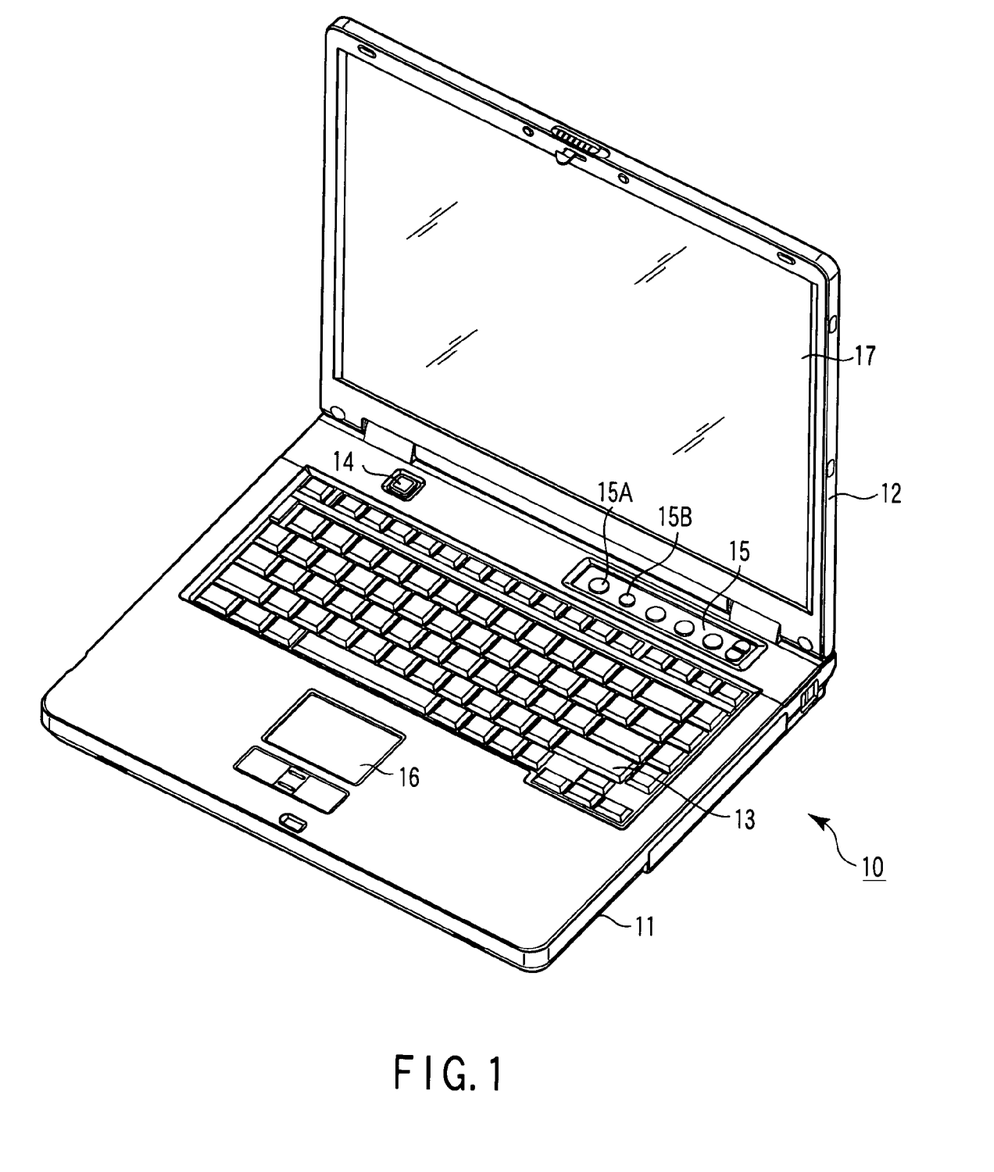
FIG. 1 is an exemplary perspective view showing a state in which a display unit of a computer according to an embodiment of the invention is opened.

FIG. 1 is a perspective view showing a state in which a display unit of the notebook computer 10 is opened. The computer 10 comprises a computer main body 11 and a display unit 12. The display unit 12 incorporates a display device comprising a TFT-LCD (Thin Film Transistor Liquid Crystal Display) 17. A display screen of the LCD 17 is located in a substantially central portion of the display unit 12.

The display unit 12 is attached to the computer main body 11 so as to be rotatable between an opened position and a closed position. The computer main body 11 has a thin box-shaped casing. The computer main body 11 comprises a keyboard 13, a power button 14 to power on/off the computer 10, an input operation panel 15, a touch pad 16, etc., which are arranged on an upper surface of the casing.

The input operation panel 15 is an input device, through which an event corresponding to a depressed button is input. It has a plurality of buttons to activate a plurality of functions, respectively. The group of buttons includes a TV activating button 15A and a DVD/CD activating button 15B. The TV activating button 15A is a button to activate TV function in order to play back, view, listen to and record TV broadcast program data. The DVD/CD activating button 15B is a button to play back video contents recorded in a DVD or CD.

A system configuration of the computer 10 will now be described with reference to FIG. 2.

Figure 2:
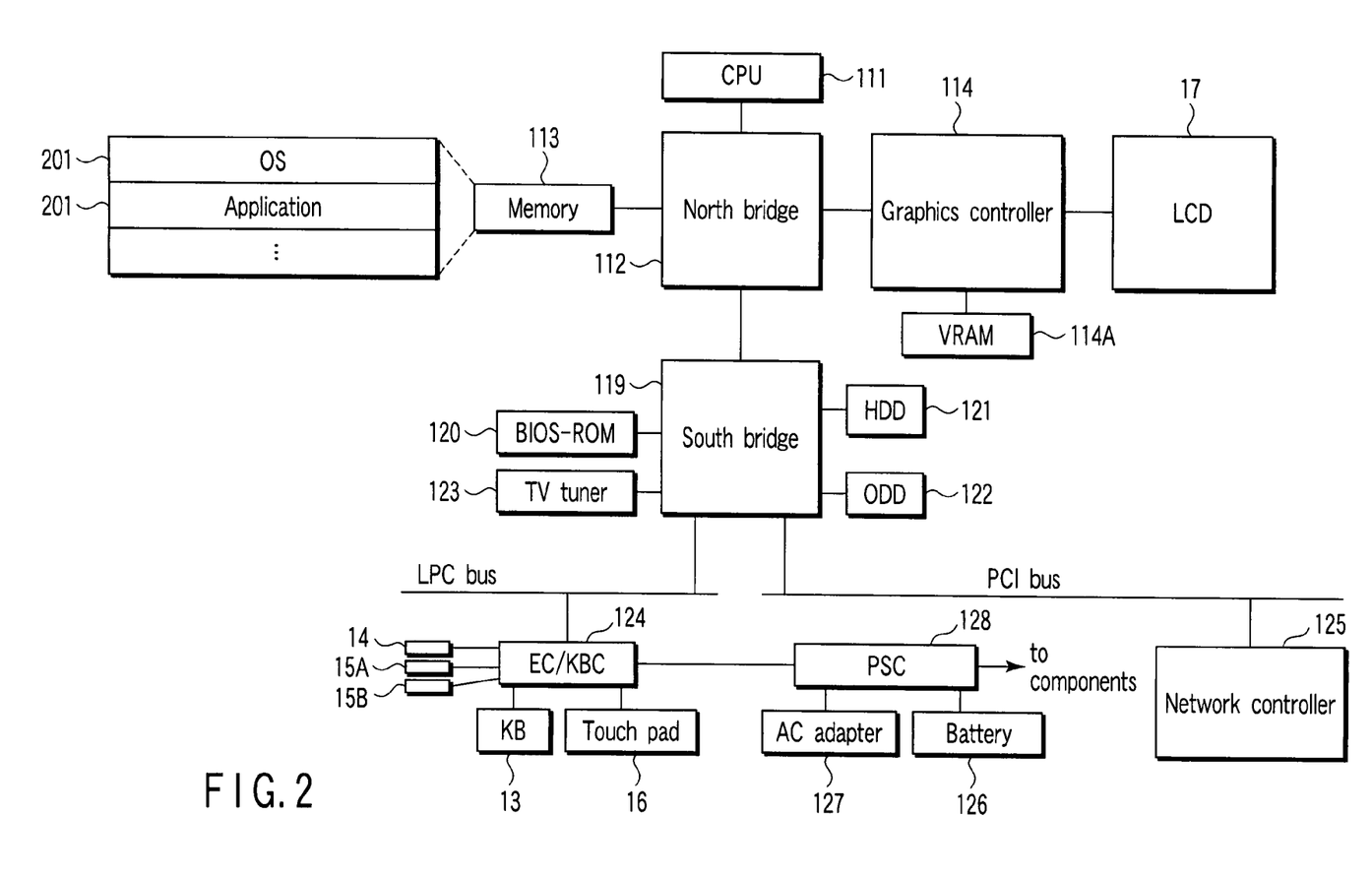
FIG. 2 is an exemplary block diagram showing a system configuration of the computer.

As shown in FIG. 2, the computer 10 comprises a CPU 111, a north bridge 112, a main memory 113, a graphics controller 114, a south bridge 119, a BIOS-ROM 120, a hard disk drive (HDD) 121, an optical disk drive (ODD) 122, a TV tuner 123, an embedded controller/keyboard controller IC (EC/KBC) 124, a network controller 125, a battery 126, an AC adapter 127, a power supply controller (PSC) 128, etc.

The CPU 111 is a processor provided to control operations of the computer 10. It executes an operating system (OS) 200 and various application programs 201 loaded from the hard disk drive (HDD) 121 to a main memory 113.

The CPU 111 also executes a system BIOS stored in the BIOS-ROM 120. The system BIOS is a program for hardware control.

The north bridge 112 is a bridge device which connects the south bridge 119 with a local bus of the CPU 111. The north bridge 112 incorporates a memory controller which controls access to the main memory 113. Further, the north bridge 112 has a function for executing communications with the graphics controller 114 via an accelerated graphics port (AGP) bus.

The graphics controller 114 is a display controller, which controls an LCD 17 used as a display monitor of the computer 10. The graphics controller 114 displays video data written in a video memory (VRAM) 114A on the LCD 17.

The south bridge 119 controls devices on a low pin count (LPC) bus and devices on a peripheral component interconnect (PCI) bus. The south bridge 119 incorporates an integrated drive electronics (IDE) controller to control the HDD 121 and ODD 122. Further, the south bridge 119 has a function for controlling the TV tuner 123 and a function for controlling access to the BIOS-ROM 120.

The HDD 121 is a storage device which stores various software and data. The optical disk drive (ODD) 123 is a drive unit to drive memory media, such as DVDs and CDs, which store video contents. The TV tuner 123 is a receiver to externally receive broadcast program data, such as TV broadcast program.

The network controller 125 is a communication apparatus, which executes communications with an external network, such as the Internet.

The embedded controller/keyboard controller IC (EC/KBC) 124 is a one-chip microcomputer, in which an embedded controller to manage power and a keyboard controller to control the keyboard (KB) 13 and the touch pad 16 are integrated. The embedded controller (EC) has a function for performing a resume operation by powering on the computer 10 in accordance with the operation on the power button 14 by the user or a resume request generated in the system.

The power supply controller (PSC) 128 generates and supplies power necessary to the respective components of the computer 10 based on power from the battery 126 or external power externally supplied through the AC adapter 127 in accordance with instructions from the embedded controller (EC).

Figure 3:
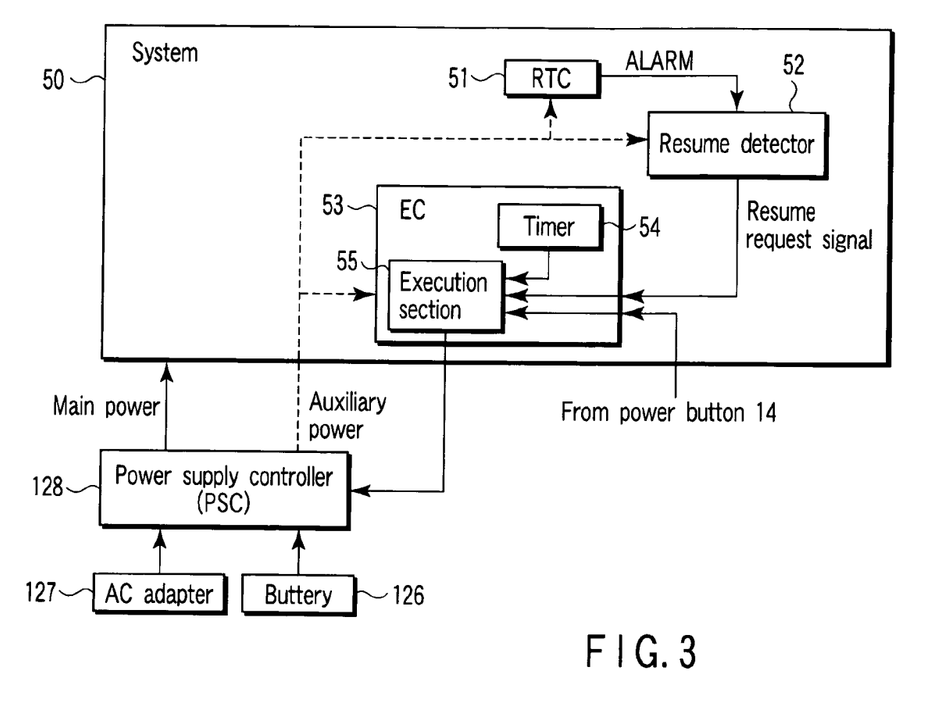
FIG. 3 is an exemplary block diagram showing a first configuration example of a part relating to resume processing in the computer.

FIG. 3 is a block diagram showing a first configuration example of a part relating to resume processing in the computer 10. The same elements as those shown in FIG. 2 are identified by the same reference numeral as those used in FIG. 2.

The computer 10 has a manual resume function, which causes the system to be restored to the condition as was immediately before the power is turned off according to a manual power-on operation, and an automatic resume function, which causes the system to be automatically restored to the condition as was immediately before the power is turned off when a predetermined condition is satisfied (for example, when the current time coincides with a preset time). The automatic resume function is implemented by, for example, a scheduler. In this embodiment, the computer 10 also has an automatic resume function of operating a specific element (specific device or application) in accordance with an alarm output from a predetermined timer.

The power supply controller (PSC) 128 is powered by the battery 126 or the AC adapter 127. It supplies main power to the components of a system 50 (including the CPU and the main memory necessary to execute the OS or various applications), when the computer 10 is powered on. Even if the computer 10 is not powered on, the power supply controller 128 can continuously supply auxiliary power to a real time clock (RTC) 51, a resume detector 52 and an EC 53, as far as the power source is effective.

Figure 4:
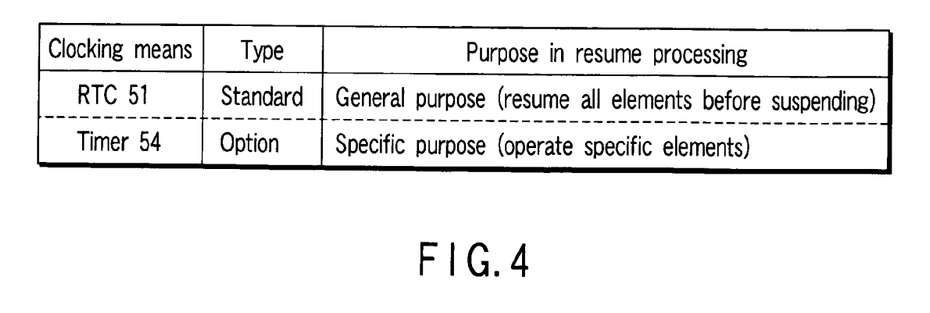
FIG. 4 is an exemplary diagram for explaining differences between a standard RTC and an additional timer.

The RTC 51 is operated by the auxiliary power supplied from the power supply controller 128. It has an alarm function as well as a time measuring function as a clock. The alarm function causes the RTC 51 to output an alarm signal when a measurement value coincides with a set date and time. As shown in FIG. 4, the RTC 51 is a standard RTC provided in the computer 10 as standard equipment. It is clocking means for use in executing resume processing for a general purpose (processing to resume operations of all devices and programs that were operating before suspending processing).

The resume detector 52 is operated by the auxiliary power supplied from the power supply controller 128. When it detects an alarm signal output from the RTC 51 (when the current time coincides with the present time), it outputs a resume request signal to request resume processing.

The EC 53 is a controller operated by the auxiliary power supplied from the power supply controller 128. It incorporates a timer 54 and an execution section 55. The timer 54 has a time measuring function as a clock, and outputs a signal indicating timeout when a measured value coincides with a set time. As shown in FIG. 3, the timer 54 is additional clocking means provided in the EC 53 and used to execute resume processing for a specific purpose (processing to operate only a specific device or program). The specific device or program may be, for example, an electronic device or mailing software (application) to check new mail or download data by accessing a network.

The execution section 55 can receive a variety of signals, such as an ON operation signal from the power button 14 operated by the user, a resume request signal from the resume detector 52 and a timeout signal output from the timer 54. It can discriminate the signals from one another. Further, it can receive a call from a predetermined device (e.g., a call from a communication module). When the execution section 55 receives any of those signals, it provides the power supply controller 128 with an instruction to supply main power to the corresponding device, or sends a request to the system to activate or resume the corresponding program. Thus, the execution section 55 executes control to perform the required resume processing.

For example, when the execution section 55 receives an ON operation signal from the power button 14 or a resume request signal from the resume detector 52, it executes control to perform the resume processing for a general purpose (processing to resume operations of all devices and programs that were operating before suspending processing). On the other hand, when the execution section 55 receives a timeout signal from the timer 54, it executes control to perform resume processing for a specific purpose (processing to resume an operation of only a necessary device or program, without resuming operations of unnecessary devices or programs).

In the configuration described above, the resume processing for a general purpose and the resume processing for a specific purpose may provide different performances for a specific element after the resume. For example, since it is necessary to operate only a specific device or program for the specific purpose, the operation frequency of the CPU or the like may be lower in the resume processing for a specific purpose as compared to a general purpose, thereby saving power.

Figure 5:
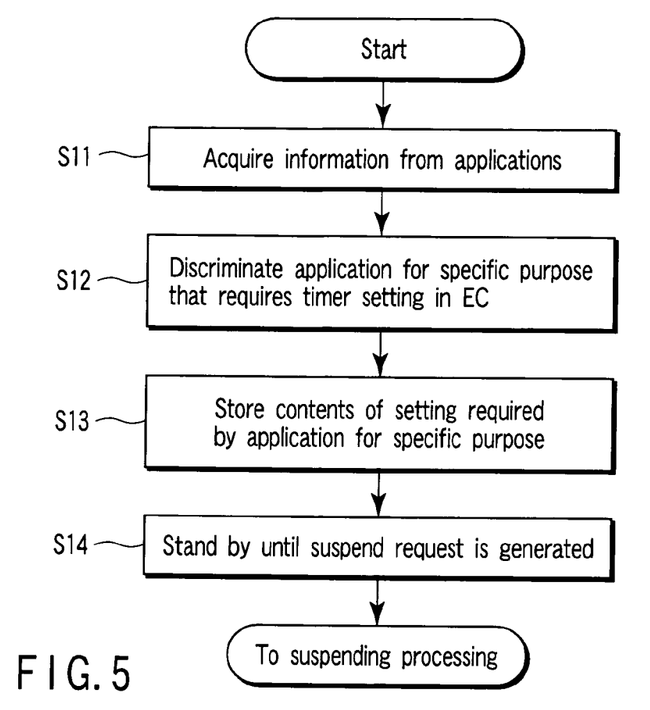
FIG. 5 is an exemplary flowchart showing an operation before suspending processing is executed in the computer.

An operation before execution of suspending processing in the computer 10 will be described with reference to the flowchart shown in FIG. 5.

It is assumed that necessary items for the resume function are set in advance in the computer 10 (for example, the date and time of an alarm is set in the RTC 51). For example, if the resume function is implemented by a scheduler, scheduler setting is made in advance.

When various information is acquired from the respective applications (block S11) in the OS, an application for a specific purpose to request setting of an activation time or the like is discriminated (block S12). The setting content required by the application for the specific purpose (the activation time or the like) is stored in a predetermined memory area through the BIOS, etc. (block S13). Then, the computer 10 stands by until a suspend request is generated (block S14).

Figure 6:
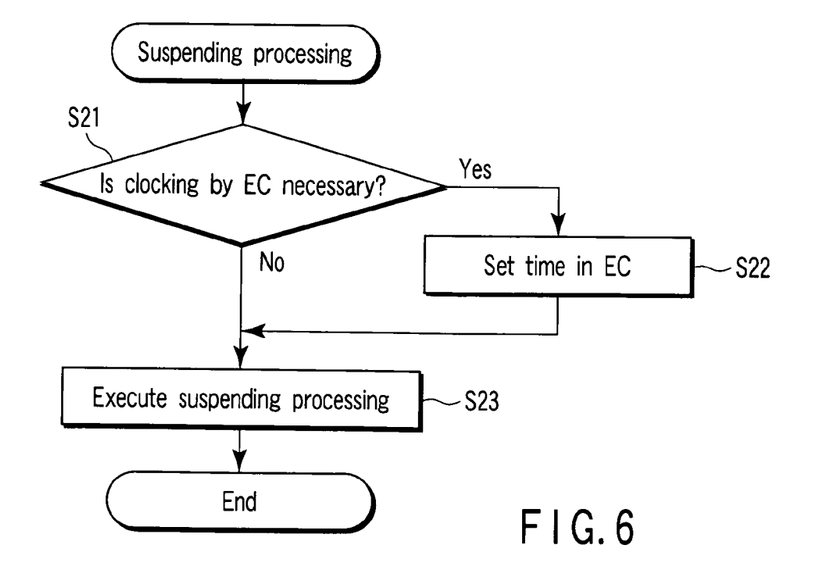
FIG. 6 is an exemplary flowchart showing an operation of the suspending processing in the computer.

An operation of the suspending processing in the computer 10 will be described with reference to the flowchart shown in FIG. 6.

When an instruction for suspending is generated, it is determined whether clocking by the timer 54 in the EC 53 is necessary or not with reference to the information relating to applications for the specific purpose in the predetermined memory area (block S21). If it is determined that clocking by the timer 54 in the EC 53 is necessary, the activation time designated by the application for the specific purpose is set in the timer 54 in the EC 53 (block S22). On the other hand, if it is determined that clocking by the timer 54 in the EC 53 is not necessary, nothing is set in the timer 54. Then, the system status is saved in a predetermined memory area, and suspending processing is executed (block S23).

Figure 7:
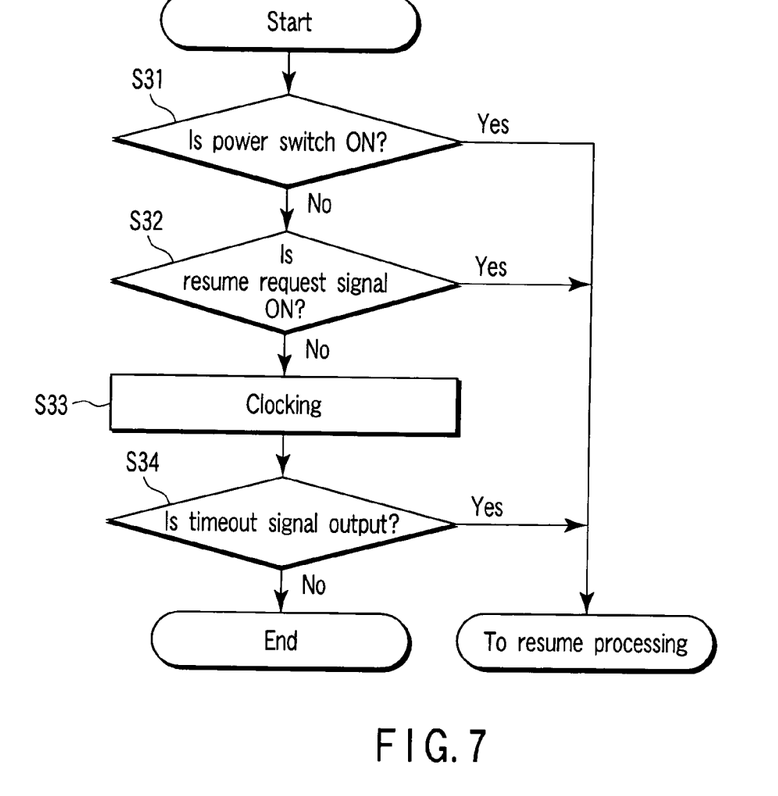
FIG. 7 is an exemplary flowchart showing an operation before resume processing is executed in the computer.

An operation before execution of resume processing in the computer 10 will be described with reference to the flowchart shown in FIG. 7.

Factors of resume processing are three: generation of an ON operation signal from the power button 14, generation of a resume request signal from the resume detector 52, and generation of a timeout signal from the timer 54 of the EC 53. More specifically, when the power button 14 is turned on (YES in block S31), the resume processing starts. If the power button 14 is not operated (NO in block S31), the RTC 51 generates an alarm signal and consequently the resume detector 52 generates a resume request signal (YES in block S32), in this case the resume processing starts. If a resume request signal is not generated (NO in block S32), clocking is performed by the timer 54 (block S33), the measurement value coincides with the set time and a timeout signal is output (YES in block S34), in this case the resume processing also starts. If a timeout signal is not output (NO in block S34), the resume processing does not start.

Figure 8:
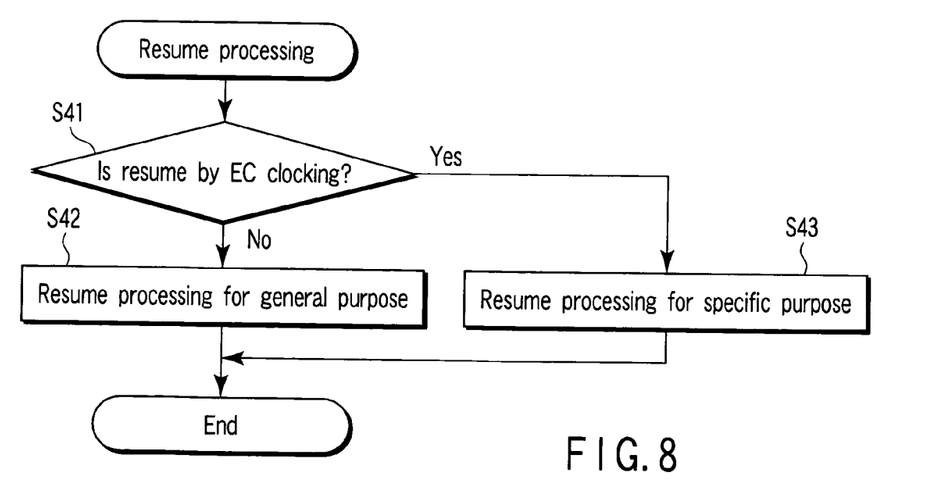
FIG. 8 is an exemplary flowchart showing an operation of the resume processing in the computer.

An operation of the resume processing in the computer 10 will be described with reference to the flowchart shown in FIG. 8.

When the execution section 55 in the EC 53 receives a signal, it determines whether the signal is a timeout signal from the timer 54 in the EC 53 (block S41). If the received signal is not a timeout signal from the timer 54 in the EC 53 but an ON operation signal from the power button 14 or a resume request signal from the resume detector 52, the execution section 55 performs control of the resume processing for a general purpose (processing to resume operations of all devices and programs that were operating before suspending processing) (block S42). If the received signal is a timeout signal from the timer 54 in the EC 53, the execution section 55 performs control of the resume processing for a specific purpose (processing to resume an operation of only a necessary device or program, without resuming operations of unnecessary devices or programs) (block S43).

Figure 9:
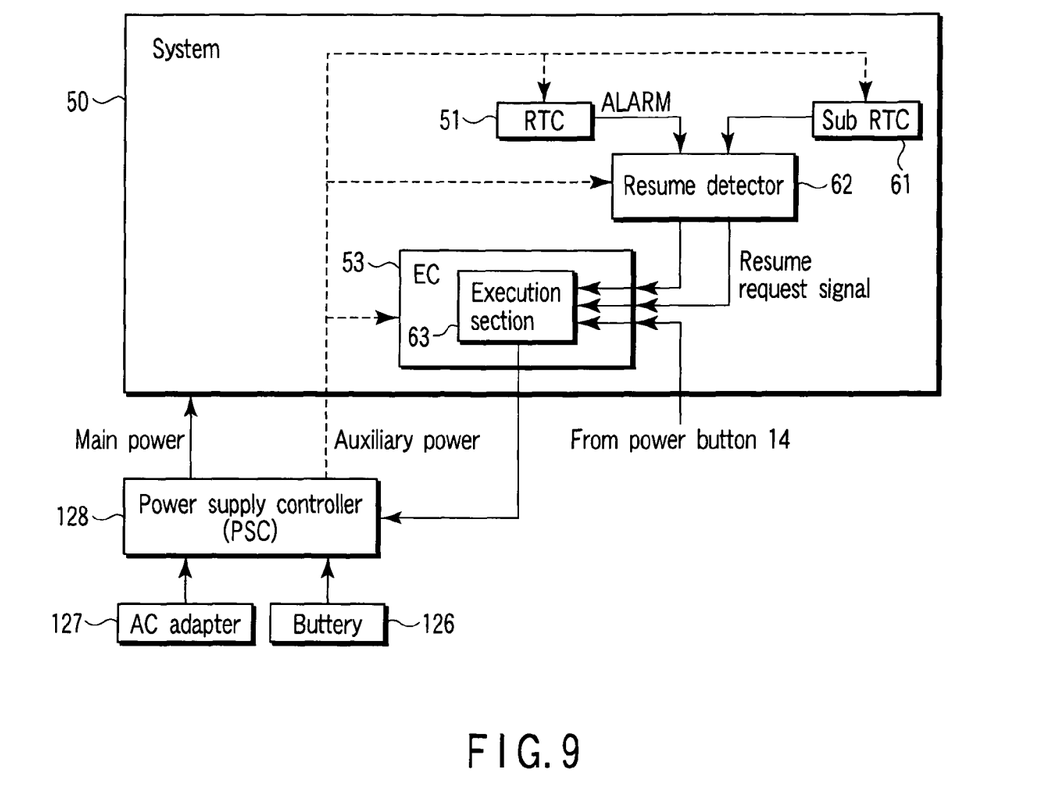
FIG. 9 is an exemplary block diagram showing a second configuration example (modification) different from the configuration example shown in FIG. 3.

FIG. 9 is a block diagram showing a second configuration example (modification) different from the configuration example shown in FIG. 3. In the following, elements that are different from those shown in FIG. 3 will be described.

In the example shown in FIG. 9, the timer 54 is not provided inside the EC 53. Instead, a sub RTC 61 is provided outside the EC 53. Basically, the sub RTC 61 has the same function as the standard RTC 51. More specifically, the sub RTC 61 is operated by the auxiliary power supplied from the power supply controller 128, and has an alarm function as well as a time measuring function as a clock. However, the RTC is used to execute the resume processing for a specific purpose (processing to operate only a specific device or program). An alarm signal, which is output when a measurement value coincides with a set date and time, is sent to a resume detector 62.

In this example, if the resume detector 62 detects an alarm signal output from the RTC 51, it sends a resume request signal for a general purpose to the EC 53. If the resume detector 62 detects an alarm signal output from the sub RTC 61, it sends a resume request signal for a specific purpose to the EC 53.

When an execution section 63 in this example receives an ON operation signal from the power button 14 or a resume request signal for a general purpose output from the resume detector 62 in response to the generation of an alarm signal from the RTC 51, it executes control to perform the resume processing for a general purpose (processing to resume operations of all devices and programs that were operating before suspending processing). On the other hand, when the execution section 63 receives a resume request signal for a specific purpose from the resume detector 62 in response to the generation of an alarm signal from the sub RTC 61, it executes control to perform resume processing for a specific purpose (processing to resume an operation of only a necessary device or program, without resuming operations of unnecessary devices or programs).

An operation of second example is similar to that of the first example described above (FIGS. 5 to 8). The operation is different from that of the first example only in that the execution section 63 receives a resume request signal for a specific purpose output from the resume detector 62 in response to the alarm generated by the sub RTC 61, instead of a timeout signal from the timer in the EC. Therefore, explanation of the operation of the second example is omitted.

As described above, this embodiment includes additional clocking means besides the standard RTC. Consequently, operation time or the like can be managed not only in the resume processing for a general purpose but also in the resume processing for a specific purpose. Thus, the operability on the side of the user can be improved.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus, comprising:
  a first clock configured to output a first signal when a measurement value coincides with a first pre-set time;
  a second clock configured to output a second signal when a measurement value coincides with a second pre-set time; and
  a controller configured to control a first resuming process of operation when the first clock outputs the first signal, and a second resuming process of operation when the second clock outputs the second signal,
  wherein the first clock comprises a standard real time clock (RTC) provided as standard equipment in the information processing apparatus, and the second clock comprises a clock different from the standard RTC.

2. An information processing apparatus having a resume function, comprising:

a first clock configured to output a first signal when a measurement value coincides with a first pre-set time;

a second clock configured to output a second signal when a measurement value coincides with a second pre-set time, the second clock being a clock different from the first clock; and a controller configured to execute a first resuming process, when the first clock outputs the first signal, to resume at least the state of operation of the apparatus that existed before suspending operation, and to execute a second resuming process, when the second clock outputs the second signal, to resume a state of operation of the apparatus that is limited as compared to the state of operation that existed before suspending operation.

3. The information processing apparatus according to claim 2, wherein the first clock is provided outside the controller and the second clock is provided inside the controller.

4. The information processing apparatus according to claim 2, wherein the first clock and the second clock are provided outside the controller.

5. The information processing apparatus according to claim 2, further comprising a resume detector to output a resume request signal to request the controller to execute the first resuming process or the second resuming process.

6. The information processing apparatus according to claim 5, wherein the resume detector is configured to detect the first signal output from the first clock and the second signal output from the second clock, and to output the resume request signal to request the controller to execute the first resuming process or the second resuming process.

7. The information processing apparatus according to claim 2, wherein:

the first resuming process comprises resuming operations of all elements of the apparatus that were operating before suspending operation.

8. The information processing apparatus according to claim 2, wherein the second resuming process comprises operating a specific element of the apparatus.

9. A resume control method applied to an information processing apparatus having a resume function, the method comprising:

enabling a first clock during operation to output a first signal when a measurement value coincides with a first pre-set time, and a second clock during operation to output a second signal when a measurement value coincides with a second pre-set time, the first clock portion comprising a standard real time clock (RTC) provided as standard equipment in the information processing apparatus, and the second clock being a clock different from the standard RTC; and enabling a controller to execute a first resuming process, when the first clock outputs the first signal, to resume at least the state of operation of the apparatus that existed before suspending operation, and to execute a second resuming process, when the second clock outputs the second signal, to resume a state of operation of the apparatus that is limited as compared to the state of operation that existed before suspending operation.

10. The resume control method according to claim 9, wherein:

the first resuming process comprises resuming operations of all elements of the apparatus that were operating before suspending operation.

11. The resume control method according to claim 10, wherein the second resuming process comprises operating a specific element of the apparatus.

* * * * *